United States Patent
Nakamura (10) Patent No.: US 6,535,595 B1
(45) Date of Patent: Mar. 18, 2003

(54) BUSY LINE DISPLAY METHOD (75) Inventor: Yoshinori Nakamura, Koriyama (JP)

(73) Assignee: Hitachi Communications Technologies, Ltd., Fukushima-ken (JP)

( * ) Notice: Subject to any disclaimer, the term of this patent is extended or adjusted under 35 U.S.C. 154(b) by 0 days.

(21) Appl. No.: 09/285,051

(22) Filed: Apr. 2, 1999

(51) Int. Cl.[7] .............................................. H04M 1/00
(52) U.S. Cl. ...................................................... 379/164
(58) Field of Search .............................. 379/164, 156, 379/157

(56) References Cited

U.S. PATENT DOCUMENTS

| | | | |
|---|---|---|---|
| 5,046,086 A | * 9/1991 | Bergen et al. ............... | 379/164 |
| 5,117,454 A | 5/1992 | Yamase | |
| 5,404,398 A | 4/1995 | Domoto et al. | |
| 5,465,292 A | 11/1995 | Takahashi et al. | |
| 5,471,525 A | * 11/1995 | Domoto et al. ......... | 379/164 X |
| 5,651,061 A | 7/1997 | Domoto et al. | |
| 5,754,642 A | 5/1998 | Domoto et al. | |
| 6,044,136 A | * 3/2000 | Takahashi et al. ....... | 379/93.23 |
| 6,263,062 B1 | 7/2001 | Kokubun | |

FOREIGN PATENT DOCUMENTS

| | | |
|---|---|---|
| EP | 0525189 | 2/1993 |
| GB | 1577461 | 4/1977 |

* cited by examiner

*Primary Examiner*—Creighton Smith
(74) *Attorney, Agent, or Firm*—Antonelli, Terry, Stout, & Kraus, LLP (57) ABSTRACT

A busy line display system of a terminal device to which a plurality of lines are connected. The lines are divided and displayed on a plurality of pages, including display of the status of busy lines. By pressing a predetermined button, line names may be displayed in the received order of the busy line information on a busy line display page so as to collectively display the busy line information displayed on other pages on that one busy line display page.

2 Claims, 11 Drawing Sheets

BUSY LINE DISPLAY METHOD

FIELD OF THE INVENTION

The present invention relates to a busy line display system of a terminal device to which a plurality of lines are connected, wherein the busy line information displayed on other pages may be collectively displayed on one page.

DESCRIPTION OF THE RELATED ART

Japanese Laid-Open Patent Publication No. 2-277360 discloses a collective call receive method, wherein a terminal device working as a telephone set is capable of communicating with the plurality of lines which are connected thereto and are divided and stored to a plurality of pages in the device, and a call received by the terminal device may be indicated on a display with a touch-sensor system of the terminal device by switching the pages indicated on the screen.

The prior art terminal device of the collective call receive method includes a received line display screen for displaying the lines that received calls collectively indicated on a page (screen). However, according to such collective call receive method, the busy lines are indicated in correspondence to the lines divided and stored to a plurality of pages. Therefore, each of the busy lines may only be confirmed by displaying one page at a time.

SUMMARY OF THE INVENTION

In order to check the busy line information displayed on pages other than the presently displayed page in the prior art terminal device employing the line display method with page switching means, the operator had to confirm the busy status of each line by changing the displayed pages. When a large number of lines were handled, it was very troublesome for the operator to check the pages one by one, so as to search which pages stored the busy lines.

The present invention solves the above mentioned problem by providing a busy line display system in which the plurality of busy state lines may be collectively displayed on one page.

In order to solve the problem, the present invention provides a busy line display system of a terminal device to which a plurality of lines are connected, said lines being divided into groups and displayed on a plurality of pages which include the display of the status of busy lines, comprising a means for displaying names of lines displayed on other pages as busy lines to a busy line display page in the received order of the busy line information when a predetermined button is pressed, so as to collectively display said busy lines being displayed on other pages.

The present invention further provides a busy line display system of a terminal device to which a plurality of lines are connected, said lines being divided and displayed on a plurality of pages which include the display of the status of busy lines, comprising a means for displaying names of lines displayed on other pages as busy lines to a busy line display page in the received order of the busy line information when a predetermined button is pressed, so as to collectively display said busy lines being displayed on other pages, wherein said system further includes a means for notifying the existence of busy lines indicated on other pages to an operator, so that said operator is enabled to select a collective display of said busy lines.

The present invention further provides a busy line display system of a terminal device to which a plurality of lines are connected, said lines being divided and displayed on a plurality of pages which include the display of the status of busy lines, comprising a means for displaying names of lines displayed on other pages as a busy lines to a busy line display page in the received order of the busy line information when a predetermined button is pressed, so as to collectively display said busy lines being displayed on other pages, wherein a terminal number of each terminal device using the line may be displayed with the respective busy line information on said busy line display page displaying the busy lines collectively, so that the busy line status may be administered collectively.

The present invention further provides a busy line display system of a terminal device to which a plurality of lines are connected, said lines being divided and displayed on a plurality of pages which include the display of the status of busy lines, comprising a means for displaying names of lines displayed on other pages as busy lines to a busy line display page in the received order of the busy line information when a predetermined button is pressed, so as to collectively display said busy lines being displayed on other pages, wherein said system further includes a means for notifying the existence of busy lines indicated on other pages to an operator, so that said operator is enabled to select a collective display of said busy lines, and a terminal number of each terminal device using the line may be displayed on the respective busy line information on said busy line display page displaying the busy lines collectively, so that the busy line status may be administered collectively.

According to the present invention, the lines presently displayed on a plurality of pages in the terminal device as being busy may be displayed collectively on a busy line display page predetermined by the setting of the local data, when the displayed page is switched to the busy line display page. Moreover, by indicating the terminal number of the busy terminal device on the busy line display, the operator may check the status of any optional line efficiently.

PREFERRED EMBODIMENT OF THE INVENTION

The embodiment of the present invention will now be explained in detail with reference to the accompanying drawings.

Figure 1:
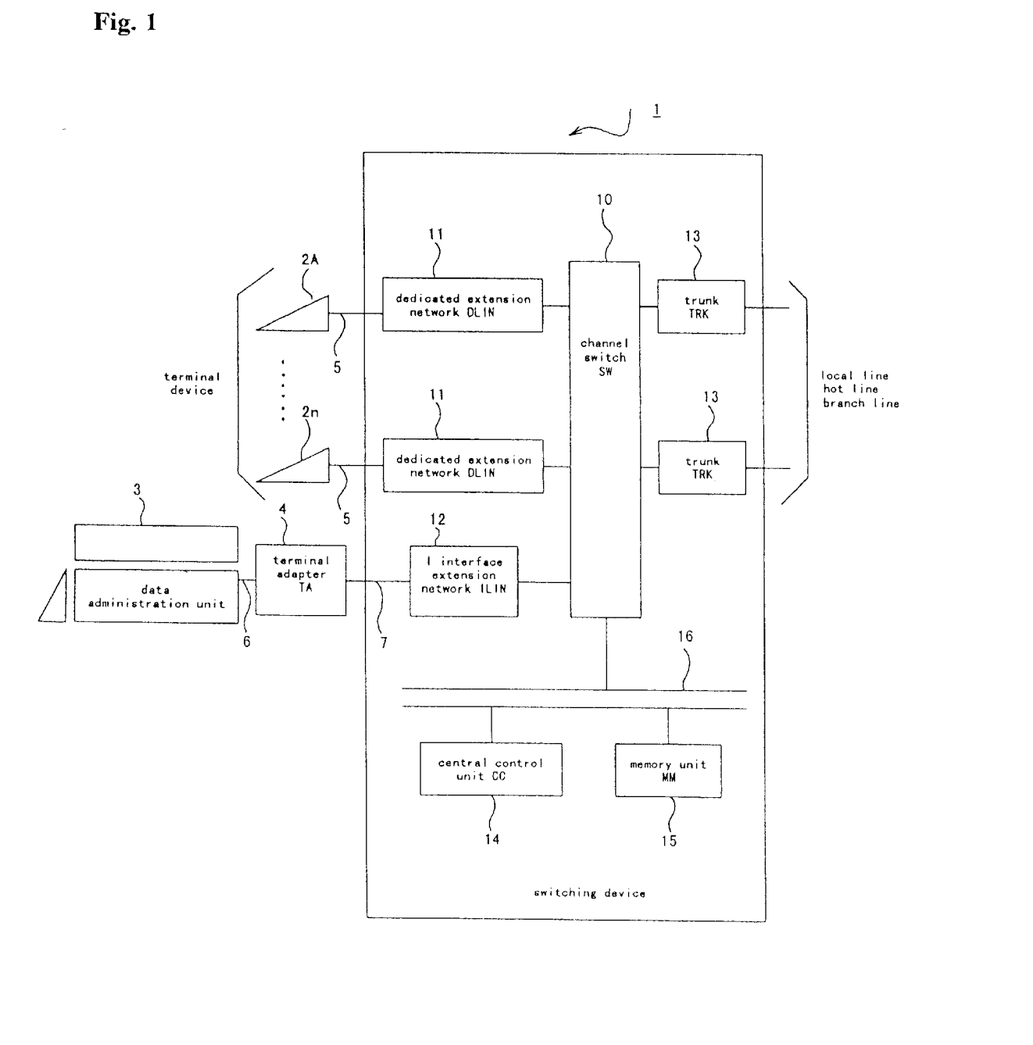
FIG. 1 is a block diagram explaining the structure of the switching system including a terminal device to which the busy line display method according to the present invention is applied.

FIG. 1 is a block diagram explaining the structure of the telephone switching system according to the present invention. The switching device to be used in the present telephone switching system comprises a channel switch (SW) 10, a dedicated extension network (DLIN) 11 for connecting and controlling a terminal device 2, an I interface extension network (ILIN) 12, a trunk (TRK) 13, a central control unit (CC) 14, a memory unit (MM) 15, and a control system bus 16.

Terminal devices 2 are connected to the channel switch 10 through the dedicated extension network (DLIN) 11. The terminal devices 2 are connected to the dedicated extension network 11 by a connection cable 5 for transmitting and receiving voice signals and call control signals.

Further, a data administration unit 3 for inputting and correcting network denotation (name) data or data determining the busy display portion of the terminal device 2 is connected to the channel switch 10 through a communication cable 6, a terminal adapter (TA) 4, a connection cable 7 and the I interface extension network (ILIN) 12.

A general purpose interface is used in the data administration unit 3.

Moreover, a local line, a hot line and a branch line are connected to the channel switch 10 through a trunk (TRK) 13 for controlling the connection of the local line, the hot line and the branch line.

The central control unit (CC) 14 controls the whole telephone switching system.

The memory unit (MM) 15 stores programs, local data and various tables for controlling the telephone switching system.

The central control unit 14 and the memory unit 15 are connected to the channel switch 10 through the control system bus 16.

Figure 2:
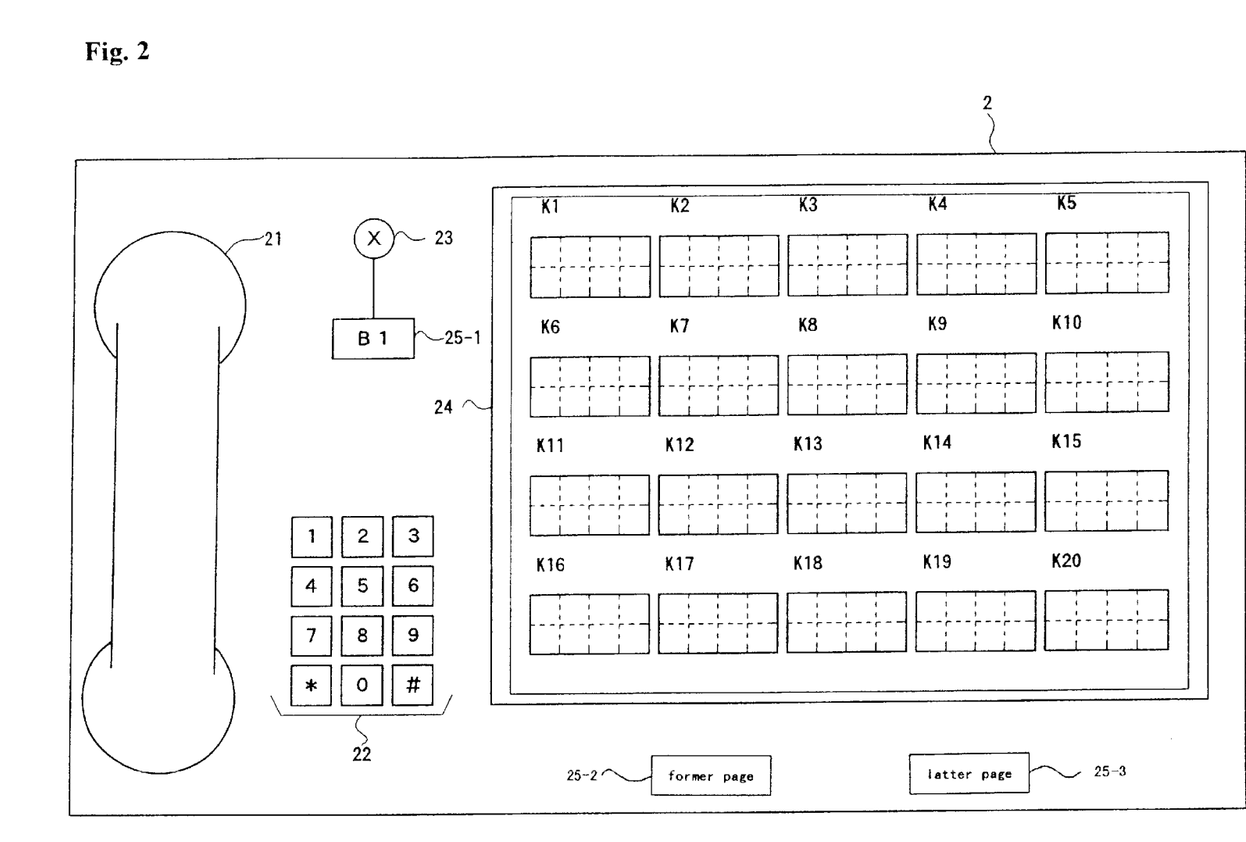
FIG. 2 is a plan view showing the structure of an upper surface of the terminal device to which the busy line display method according to the present invention is applied.
Figure 3:
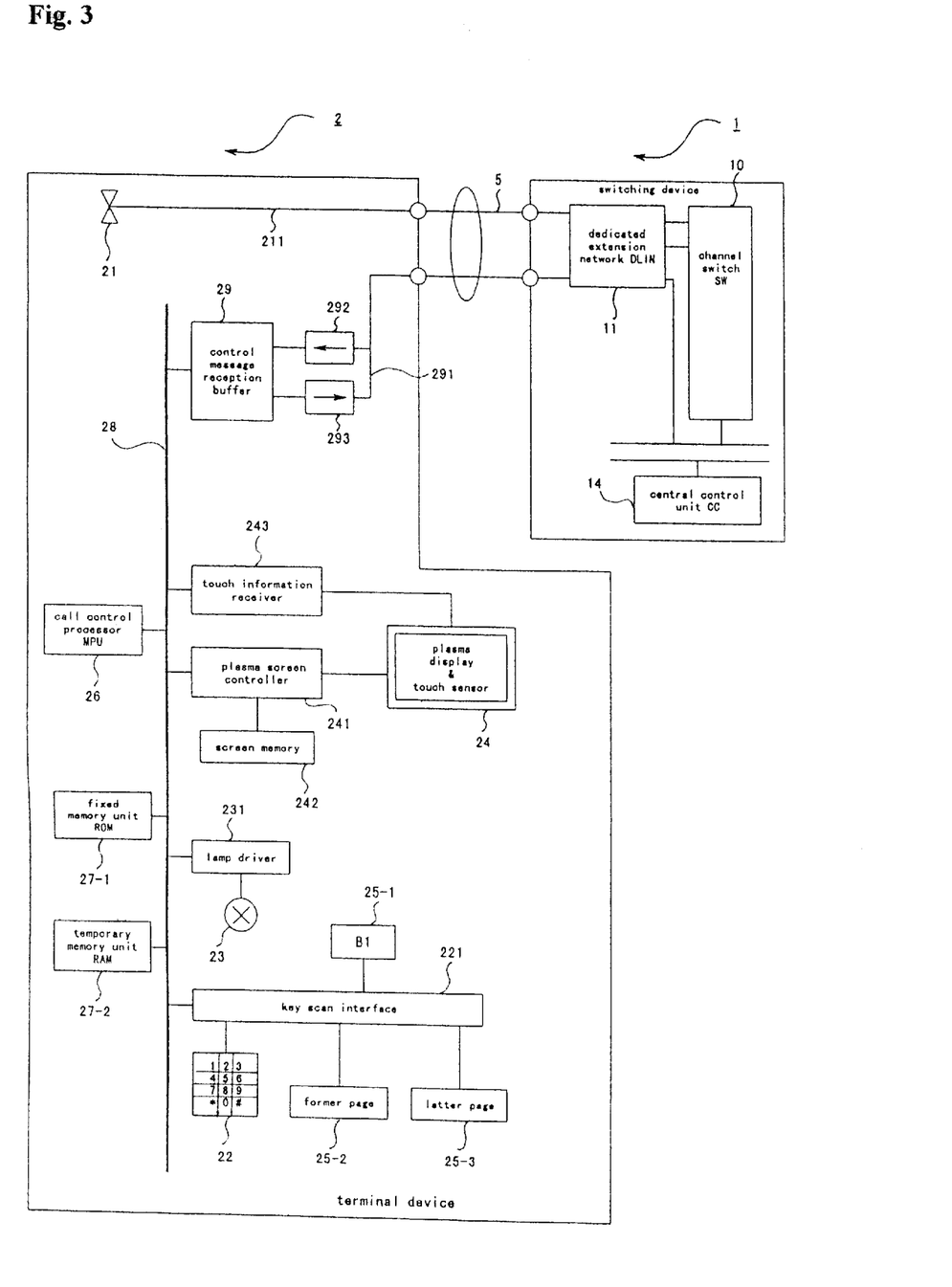
FIG. 3 is a block diagram showing the function of the terminal device.

FIGS. 2 and 3 are referred to in explaining the structure of the terminal device to be used according to the present invention. FIG. 2 is an outline showing the structure of the operation surface of the terminal device 2 to be used in the present embodiment, and FIG. 3 is a block diagram showing the function thereof.

The terminal device 2 comprises on its surface a handset 21 for calls, a dial key group 22, a lamp 23, a plasma display 24 with touch sensors, a busy line display selecting button 25-1, a "former page" button 25-2 and a "latter page" button 25-3.

The plasma display 24 with touch sensors include a plasma display for displaying characters and graphics, and sensors formed on the surface of the display, for example, a sensor for detecting the interruption of light caused by the approach of a fingertip and the like, or a sensor for detecting the pressure on the surface of the display caused by being touched. The sensor provides a similar effect as a button by utilizing the gained position information. The display is capable of indicating line denotations(names) from K1 through K20 which are set in advance by the local data.

The plasma display 24 employs a line display method capable of switching pages, and the various pages include a page displaying only the busy lines or a page for registering the line to be stored to a certain terminal device. The lines are divided into groups of a plural number of lines, and the names of lines may be displayed on the terminal by a page skip operation and the like.

The busy line display selecting button (B1) 25-1 is a button for switching the plasma display 24 to indicate only the busy lines. A lamp 23 is formed to correspond to the busy line display selecting button 25-1.

The lamp 23 shows whether a busy line to be displayed on the busy line display page exists or not. When such line exists, the lamp flashes, but when not, the lamp is turned off. If the busy line display selecting button 25-1 (button B1) is pressed when the lamp 23 is flashing, the names of busy lines are displayed on the plasma display 24.

The "former page" button 25-2 is a button for turning back the pages on the plasma display 24, and the "latter page" button is for advancing the pages on the plasma display 24. By operating the "former page" button and the "latter page" button, the page indicated on the plasma display 24 may be switched, and the busy lines may be checked.

FIG. 3 is a functional block diagram showing the hardware composition of the terminal device 2.

The terminal device 2 comprises on its top operation surface a handset 21, a dial key group 22, a lamp 23, a plasma display 24 with touch sensors, a busy line display selecting button 25-1, a "former" page button 25-2 and a "latter page" button 25-3.

Moreover, the terminal device 2 comprises a call control processor (MPU) 26, a fixed memory unit (ROM) 27-1, a temporary memory unit (RAM) 27-2, a control bus 28, a call control message transmission/reception buffer 29, a channel (B channel) 211 for data or voice of ISDN basic interface, a key scan interface 221, a lamp driver 231, a plasma screen controller 241, a screen memory 242, a touch information receiver 243, a channel (D channel) 291 for an ISDN basic interface signal, a reception buffer 292, and a transmission buffer 293.

The call control processor (MPU) 26 controls the whole terminal device 2.

To the call control processor 26 is connected through the control bus 28 the fixed memory unit (ROM) 27-1 for storing the call control program and fixed data, the temporary memory unit (RAM) 27-2 for storing the data that differs for every delivered local office, such as the local data including the line names, the call control message transmission/reception buffer 29, the key scan interface 221 for scanning and detecting the switching of each of the dial key group 22, the call display selecting button 25-1, the "former page" button 25-2 and the "latter page" button 25-3, the lamp driver 231 for driving lamp 23, the plasma screen controller 241 and the touch information receiver 243.

The call control message transmission/reception buffer 29 for transmitting and receiving the call control message between the switching device 1 is connected to the call control processor 26, which is controlled as a whole by the call control program.

Further, the reception buffer 292 for receiving the call control message showing the status of the lines stored to the switching device 1, and the transmission buffer 293 for transmitting a call control message showing the content of operation of the terminal device 2 and the like to the switching device 1 are connected to the call control message transmission/reception buffer 29 through the channel (D channel) 291 for the ISDN basic interface signal.

The telephone handset 21 is connected to the channel (B channel) 211 for data and voice of the ISDN basic interface.

This is further connected to the channel switch 10 through the dedicated exchange network 11 of the switching device.

The plasma screen controller 241 is connected to the screen memory 242 for indicating graphics or characters and words (key frames, line names and the like) on the screen of the plasma display 24 with touch sensors. The contents of the screen memory 242 are written in by the call control processor 26 through the screen controller 241, and the screen controller 241 performs the plasma display process.

Further, the touch information receiver 243 is for receiving the position information from the touch sensors, so as to provide a function similar to pressing a button.

Figure 4:
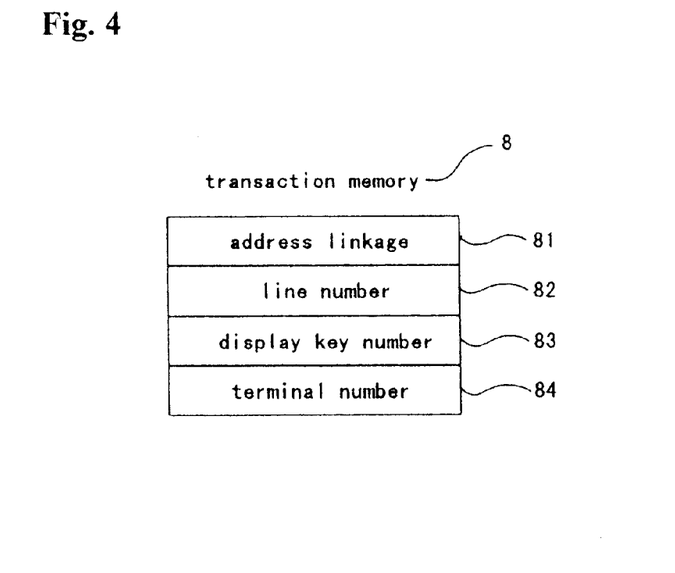
FIG. 4 is an explanatory view showing the structure of the transaction memory to be used in the busy line display method according to the present invention.

With reference to FIG. 4, the structure of a transaction memory to be used for indicating the busy lines on the busy line display page of the terminal device 2 is explained.

A transaction memory 8 is positioned in the RAM 27-2 inside the terminal device 2, and the number of said memories is set to an appropriate number corresponding to the amount of calls.

The transaction memory comprises an address linkage section 81 for the logic linkage between the plurality transactions, a line number section 82 for the lines that are busy, a display key number section 83 being indicated on the busy line display portion, and a terminal number section 84 for the number of the terminal device using the line.

The memory address of the next transaction to be performed when the line is busy is written in the address linkage section 81.

The line numbers are stored in the line section 82.

Display key numbers (K1–K20) are entered in the display key number section 83.

The terminal number is entered in the terminal number section 84 when the line becomes busy.

Figure 5:
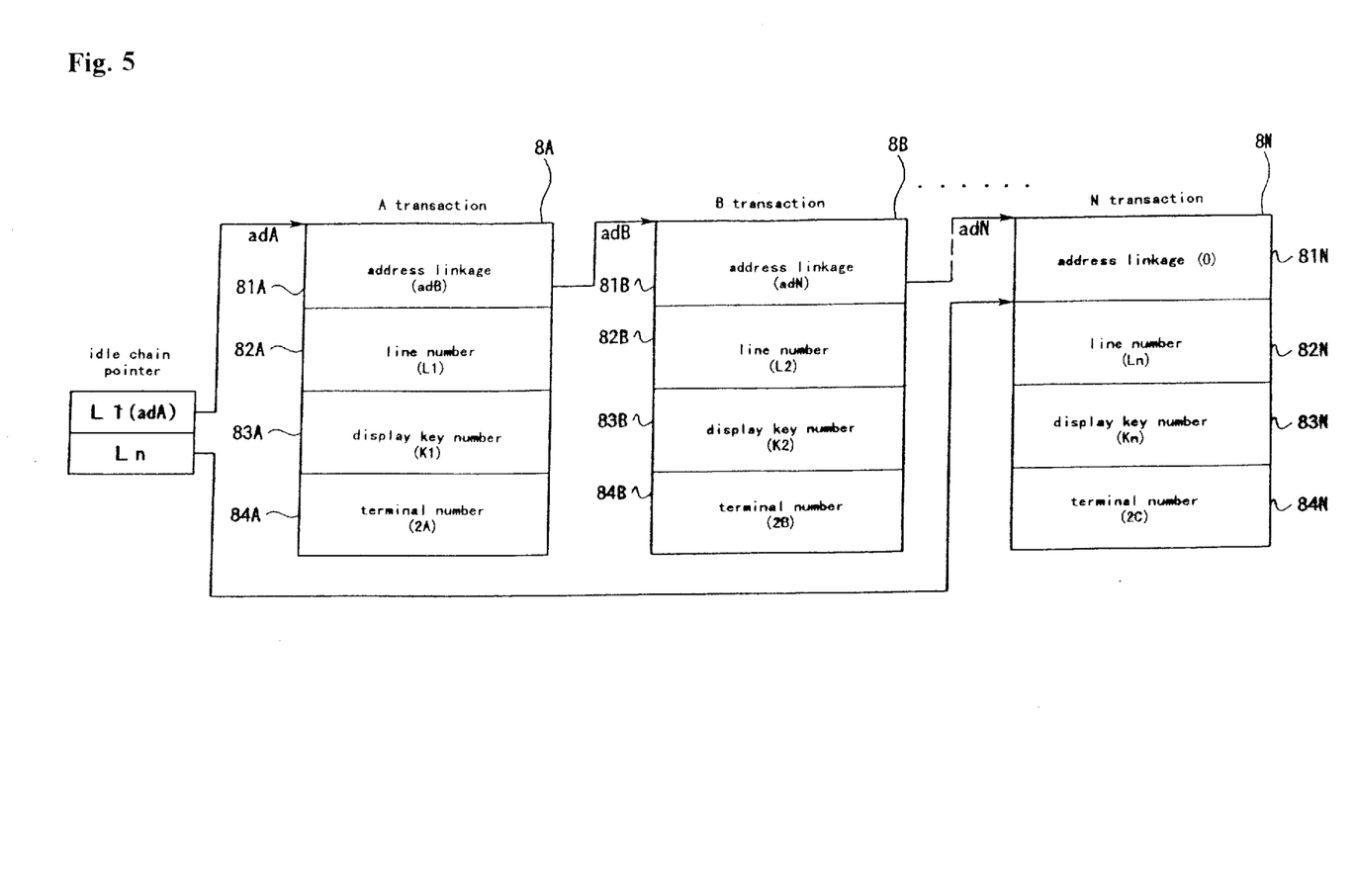
FIG. 5 is a diagram showing the idle chain connection of the transaction memory.

FIG. 5 is used to explain the idle chain of the transaction memory 8.

FIG. 5 shows "n" numbers of transactions 8A, 8B . . . 8N, which are transaction memories for indication of busy lines.

A memory address "adA" of the A transaction of a busy line L1 and an N transaction of a busy line Ln is registered to an idle chain pointer.

A memory address "adB" of the B transaction 8B of a busy line L2 is registered to the address linkage 81A of the A transaction 8A of the busy line L1. A memory address "and" of the N transaction memory of the line Ln is registered to an address linkage 81B of the B transaction 8B of the busy line L2. Moreover, a number "0" indicating that no further busy call exists is indicated to the address linkage 81N of the busy line Ln.

The line numbers "L1"–"Ln" which are busy are set in the line number section 82.

Display key numbers "K0"–"Kn" of the busy line display portion showing the busy lines are indicated to the display key number section 83. The display key numbers are allocated in the order that the busy information is received.

Terminal numbers "2A"–"2N" of the terminal devices using the lines are allocated to the terminal number section 84.

As explained above, the busy line display is maintained by the transaction memory 8 corresponding to the busy lines which are connected to the idle chain with the pointer placed at the head.

Figure 6:
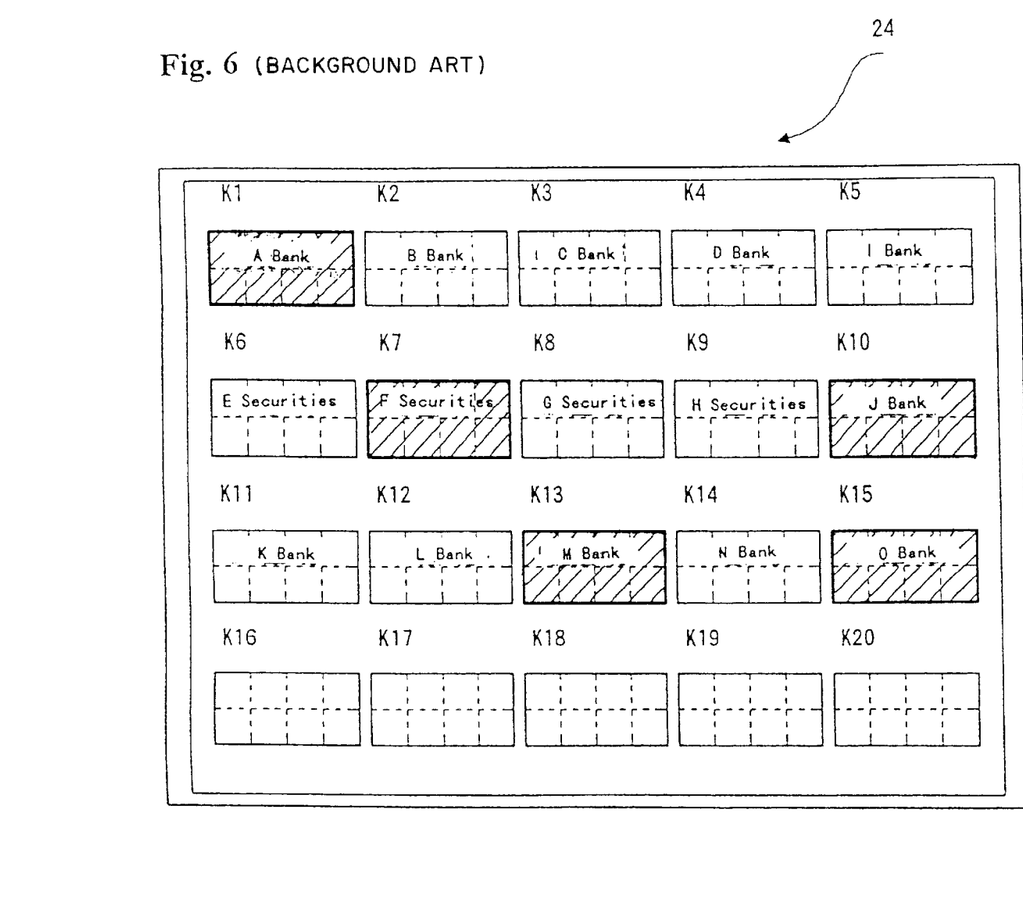
FIG. 6 is an explanatory view of the busy line display according to a prior art terminal device.

FIG. 6 is a view showing the busy lines stored in a displayed page of the plasma display 24. The line keys K1 through K15 stored in the displayed page indicate the line names, wherein the status of the lines of A Bank "K1", F Securities "K7", J Bank "K10", M Bank "K13", and O Bank "K15" are indicated to be busy.

The method of displaying the busy status according to the present invention may be any commonly used method, and the detailed explanation thereof is omitted. For example, the lighted dot and the dark dot within the key frame of the display may be reversed with an appropriate time interval, or the key frame itself may be indicated by a bold image or a narrow image so as to indicate which line is busy.

Figure 7:
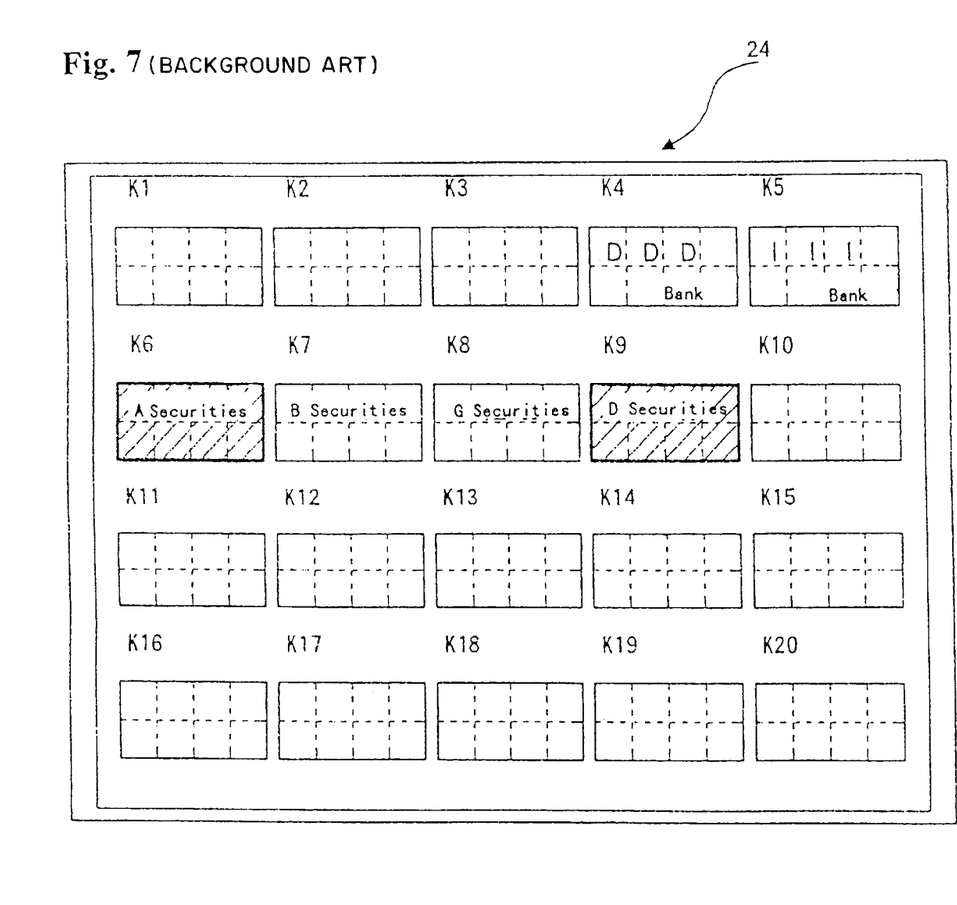
FIG. 7 is an explanatory view of the busy line display on another page according to the prior art terminal device.

FIG. 7 shows the state where the information on the plasma display 24 is switched from the page shown in FIG. 6 to another page by pressing the "latter page" button 25-3. This page is now called the displayed page.

The displayed page shown in FIG. 7 indicates line names which are different from the line names indicated on the line keys of the page shown in FIG. 6.

That is, other lines are stored to the line keys K1, K7, K10, K13 and K15. The line of the "A Securities" indicated on the line key K6 and the line of the "D Securities" indicated on the line key K9 are shown to be busy.

In such state, the names of busy lines on pages other than the presently displayed page may not be indicated on the display.

In this case, the user needs to operate the "former page" button 25-2 and the "latter page" button 25-3 in order to confirm the busy state lines stored in each of the other pages.

In a large scale terminal device storing hundreds or thousands of lines, there is a need to divide the lines into plural groups, and store one group to a page. Therefore, it is troublesome for the user to check which pages stored the busy lines by turning the pages.

Figure 8:
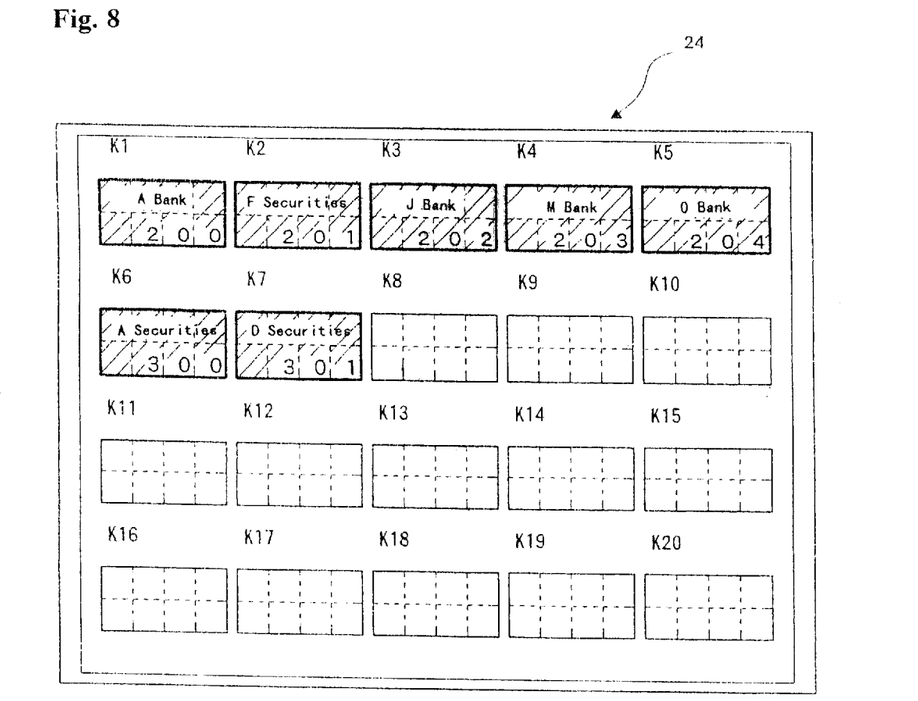
FIG. 8 is an explanatory view of the busy line display page according to the terminal device of the present invention.

FIG. 8 shows the display example of the busy lines according to the present invention. A busy line display page, indicating only the busy lines, is shown on the plasma display 24, and the busy lines are collectively display on that page.

The busy line display page comprises a similar display region as the stored line display page. When the stored line display page as shown in FIG. 6 is switched to the busy line display page from a normal line display page, the status of the key K6 for "A Securities" and key K9 for "D Securities" shown on the other page (shown in FIG. 7) may simultaneously be displayed on the plasma display, together with the busy line display of key K1 for "A Bank", K7 for "F Securities", K10 for "J Bank", K13 for "M Bank" and K15 for "O Bank".

Further, since the terminal number of the terminal devices may also be shown in the frames of each busy line display, the user may observe the status of each of the busy lines efficiently.

Figure 9:
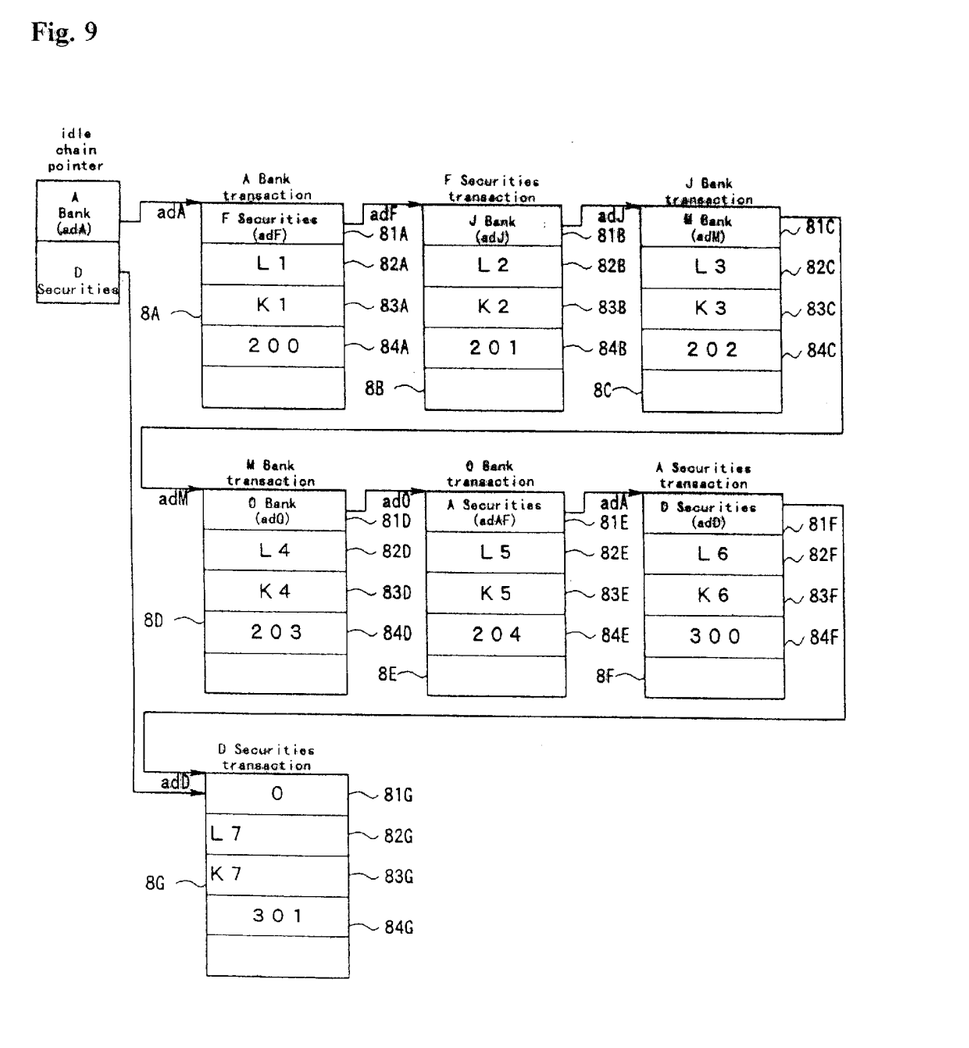
FIG. 9 is a diagram showing the idle chain connection of the busy line display according to FIG. 8.

FIG. 9 shows the idle chain of the transaction memory 8 for each busy line displayed on the plasma display 24 of FIG. 8.

The A Bank transaction memory address "adA" for "A Bank" of the busy line key K1 is registered to the idle chain pointer.

In the transaction 8A for the A Bank displayed on the busy line key K1, the memory address "adF" for the F Securities transaction 8B stored to the busy line display key K2 is registered to the address linkage section 81A, the line "L1" stored to the busy line display key K1 is registered to the line number section 82A, the busy line display key "K1" is registered to the display key number section 83A, and the terminal number "200" using the line L1 is registered to the terminal number section 84A.

Further, in the F Securities transaction 8B of the F Securities displayed on the busy line key K2, the memory address "adJ" of the J securities transaction 8C stored to the busy line display key K3 is registered to the address linkage section 81B, the line "L2" stored to the busy line display key K2 is registered to the line number section 82B, the busy line display key "K2" is registered to the display key number section 83B, and the terminal number "201" using the line L2 is registered to the terminal number section 84B.

In the J Bank transaction 8C of the J Bank displayed on the busy line key K3, the memory address "adM" of the M Bank transaction 8D stored to the busy line display key K4 is registered to the address linkage section 81C, the line "L3" stored to the busy line display key K3 is registered to the line number section 82C, the busy line display key "K3" is registered to the display key number section 83C, and the terminal number "202" using the line L3 is registered to the terminal number section 84C.

In the M Bank transaction 8D of the M Bank displayed on the busy line key K4, the memory address "adO" of the O Bank transaction 8E stored to the busy line display key K5 is registered to the address linkage section 81D, the line "L4" stored to the busy line display key K4 is registered to the line number section 82D, the busy line display key "K4" is registered to the display key number section 83D, and the terminal number "203" using the line L4 is registered to the terminal number section 84D.

In the O Bank transaction 8E of the O Bank displayed on the busy line key K5, the memory address "adAF" of the A Securities transaction 8F stored to the busy line display key K6 is registered to the address linkage section 81E, the line "L5" stored to the busy line display key K5 is registered to the line number section 82E, the busy line display key "K5" is registered to the display key number section 83E, and the terminal number "204" using the line L5 is registered to the terminal number section 84E.

In the A Securities transaction 8F of the A Securities displayed on the busy line key K6, the memory address "adD" of the D Securities transaction 8G stored to the busy line display key K7 is registered to the address linkage section 81F, the line "L6" stored to the busy line display key K6 is registered to the line number section 82F, the busy line display key "K3" is registered to the display key number section 83F, and the terminal number "300" using the line L6 is registered to the terminal number section 84F.

In the D Securities transaction 8G of the D Securities displayed on the busy line key K7, the number "0" indicating that there is no further transaction is registered to the address linkage section 81G, the line "L7" stored to the busy line display key K7 is registered to the line number section 82G, the busy line display key "K7" is registered to the display key number section 83G, and the terminal number "301" using the line L7 is registered to the terminal number section 84G.

The means for displaying all the busy line information collectively to the busy line display page will now be explained, with reference to the above-mentioned transaction memory 8.

Figure 10:
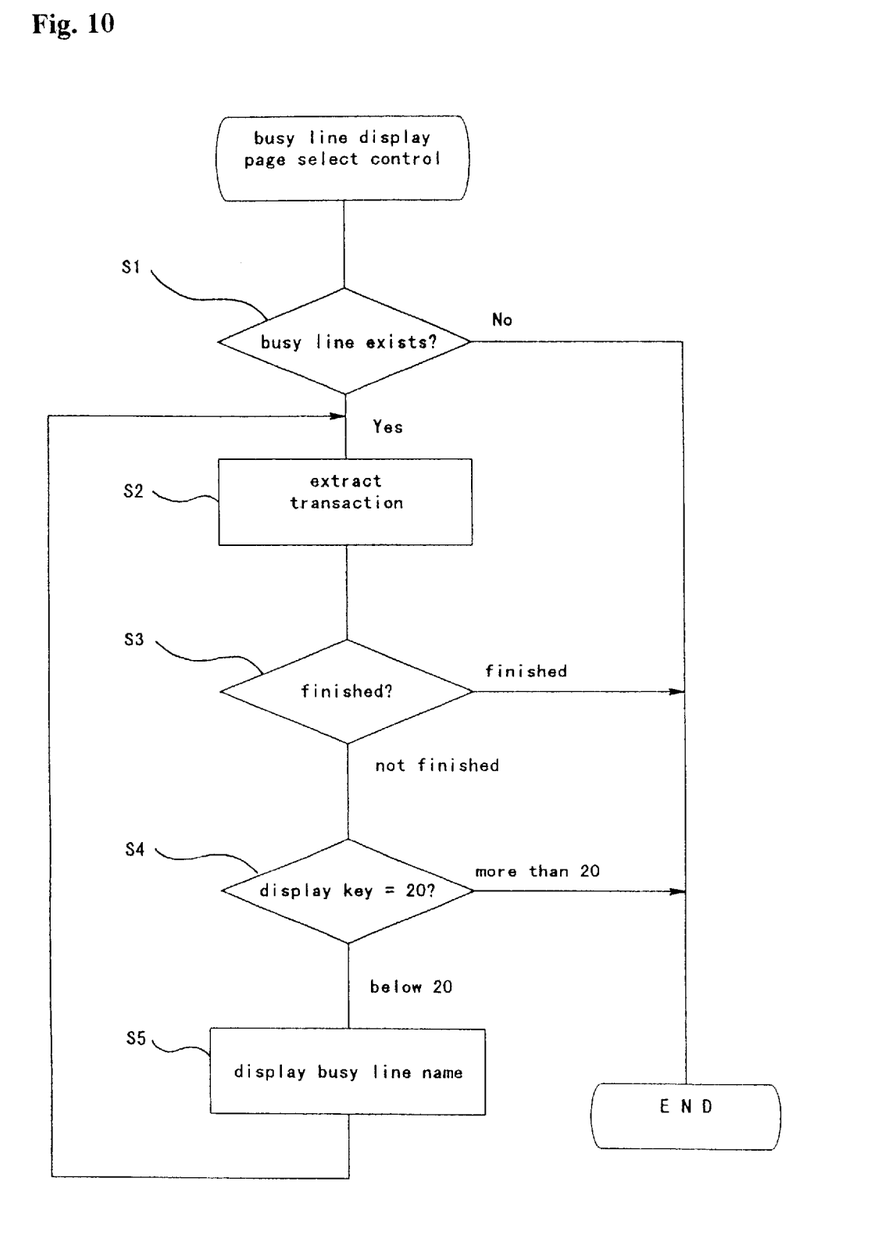
FIG. 10 is a flowchart showing the display control of the busy line display page.

FIG. 10 is a flowchart showing the steps for displaying the line names when switching the displayed page from the stored line display page to the busy line display page.

When the operator switches the display to the busy line display page, it is determined whether a busy line exists in the terminal device 2 or not by referring to a busy line queue head point (S1). If not, the process is terminated.

When a busy line exists, the transaction memory 8 is extracted in order (S2). Next, judgement is made on whether the extraction of the transaction memory is finished or not (S3), and if it is not finished, then examination is made on whether or not the display key number of the busy line display page is more than "20" (S4).

When the display key number is below "20", the name of the busy line is displayed on the display position of the display key number (S5).

Next, the procedure is returned to step S2, where the succeeding transaction memory 8 is extracted, and the process is continued.

When the display key number is more than "20" at step S4, the present process is terminated, since it is beyond the range of the busy line display page.

Further, the present process is also terminated when it is determined at S3 that the transaction memory 8 is finished after the memories 8 are extracted in order at step S2.

The indicated page may be switched to the busy line display page by pressing the busy line indication page selecting button B1, as mentioned priorly. The lamp 23 of the busy line display page selecting button 25-1 indicates that a busy line exists in the other pages.

Figure 11:
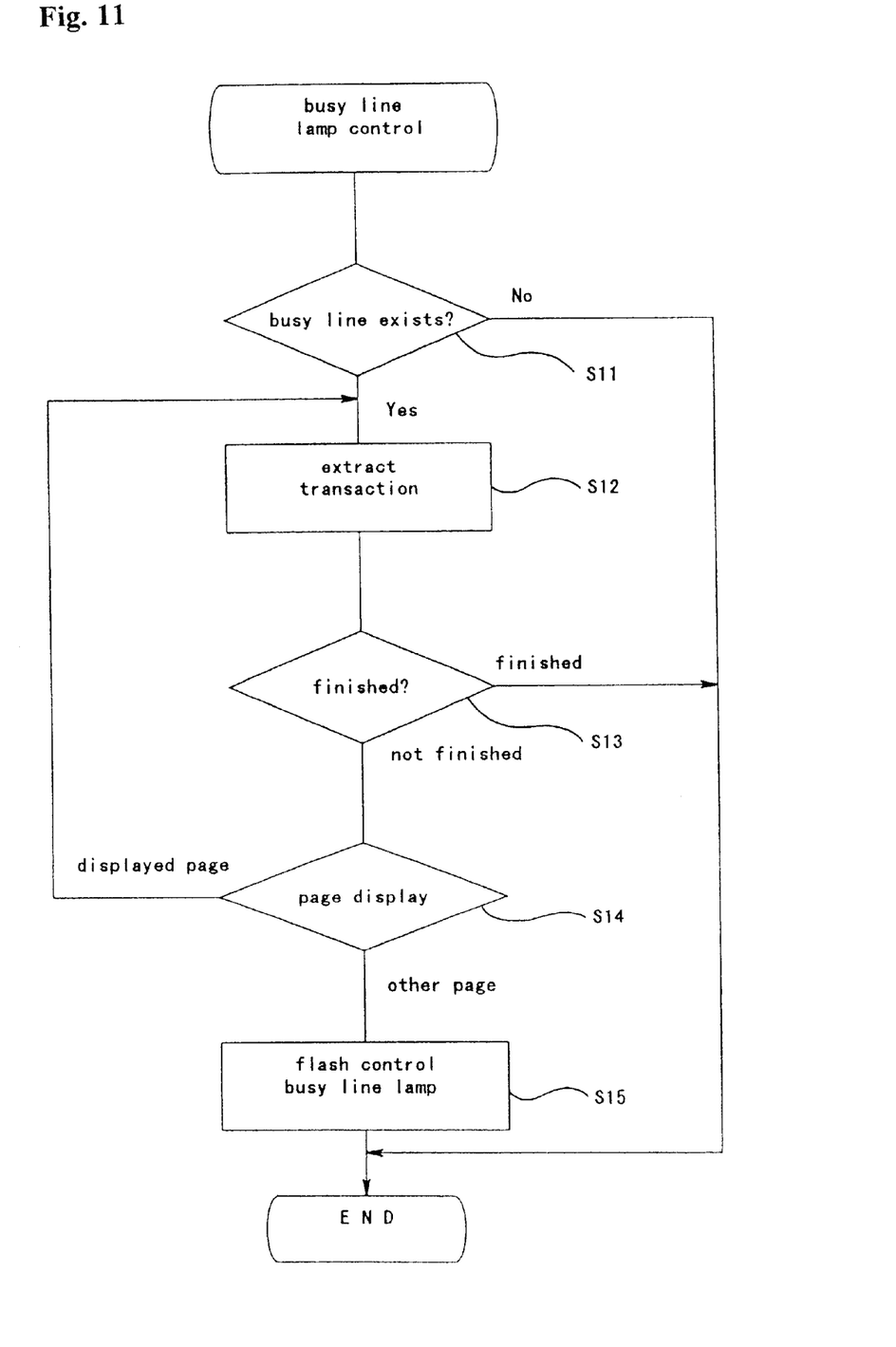
FIG. 11 is a flowchart showing the lamp control of the busy line display page selecting button.

FIG. 11 is utilized to explain the steps of controlling the lamp 23 for indicating that a busy line exists other than the lines indicated on the displayed page, when a busy line exists on other pages and not all the busy lines may be displayed on the busy line display page.

In step S11, it is determined whether a busy line exists or not the terminal device 2, by referring to the busy line queue head pointer (S11). If not, the process is terminated. When a busy line exists, then the transaction memory 8 is extracted in order (S12). Then, judgment is made on whether the extraction of the transaction memory is terminated or not (S13).

When the extraction is not terminated, then in the next step, judgement is made on whether the extracted transaction may be displayed on the presently displayed page or not (S14), by a process similar to step S4 of FIG. 10. When it is judged that the transaction may be displayed on the presently displayed page, then the name of the busy line is displayed on the page, and the procedure is returned to step S12, where the succeeding transaction memory 8 is extracted for the busy line display process.

When it is judged in step S14 that the busy line information may not be displayed on the presently displayed page, the lamp driver 231 is controlled so as to indicate such fact by the lamp 23 (S15), thereby terminating the process.

Further, when no more busy transaction memory 8 exists after all the transaction memories 8 are extracted in order and before the condition of step S4 realizes, then the flashing process of the lamp 23 is skipped, and the present process is terminated, since there are no busy lines on other pages.

According to the above-mentioned process, the lamp 23 of the selecting button 25-1 may be switched on when busy calls exist on other pages, and therefore, the user of the line may be determined and displayed with the busy lines on one page.

As explained above, the present invention enables the operator of a terminal device to switch the display of the device from a normal page to a busy line display page where a plurality of busy line names may be indicated collectively, which enables the operator to observe the status of any optional line efficiently.

What is claimed is:

1. A busy line display system in a terminal device coupled to a communication switching device having a plurality of communication lines connected thereto, said system comprising:

a display device capable of displaying page by page indications of the status of each of the plurality of communication lines;

a display selecting button;

a memory for storing busy line information indicating those of the plurality of communication lines that are busy and terminal information indicating terminal devices that are using the busy communication lines;

a call control device for extracting the busy line information from said memory when said display selecting button is actuated; and busy line display control means for displaying on said display device, as a single busy lines indication page, indications of the busy communication lines and terminal information identifying terminal devices using the busy communication lines, based on the busy line information extracted by said call control device.

2. A busy line display system according to claim 1, further comprising:

status display, means for indicating that some pages include the busy line indication to prompt a user to collectively display the busy lines.

* * * * *